United States Patent
Oguma

(10) Patent No.: US 7,127,183 B2
(45) Date of Patent: Oct. 24, 2006

(54) OUTPUT MONITOR/CONTROL APPARATUS AND OPTICAL COMMUNICATION SYSTEM

(75) Inventor: Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 809 days.

(21) Appl. No.: 09/963,531

(22) Filed: Sep. 27, 2001

(65) Prior Publication Data

US 2002/0041414 A1    Apr. 11, 2002

(30) Foreign Application Priority Data

Sep. 29, 2000  (JP) ............................ 2000-298386

(51) Int. Cl.
*H04B 10/04* (2006.01)
*H04B 10/06* (2006.01)

(52) U.S. Cl. .................. 398/192; 398/200; 398/201; 398/207; 398/212; 398/213

(58) Field of Classification Search ............... 398/158, 398/192, 200, 201, 207, 212, 213; 356/460, 356/477, 478
See application file for complete search history.

(56) References Cited

U.S. PATENT DOCUMENTS

| 5,414,548 | A | * | 5/1995 | Tachikawa et al. ........... 398/87 |
| 6,011,623 | A | * | 1/2000 | MacDonald et al. ........ 356/519 |
| 6,166,815 | A | * | 12/2000 | Vali et al. ..................... 356/477 |
| 6,396,605 | B1 | * | 5/2002 | Heflinger et al. ........... 398/140 |
| 6,445,477 | B1 | * | 9/2002 | Madsen et al. ............. 398/192 |

FOREIGN PATENT DOCUMENTS

| JP | 5-267760 | 10/1993 |
| JP | 11-31859 | 2/1999 |
| JP | 11031859 A | * 2/1999 |
| JP | 2000-22259 | 1/2000 |
| JP | 2001-24274 | 1/2000 |
| JP | 2000-223761 | 8/2000 |
| JP | 2000-232248 | 8/2000 |
| JP | 2000-236135 | 8/2000 |
| JP | 2001-7438 | 1/2001 |
| JP | 2002-43687 | 2/2002 |

OTHER PUBLICATIONS

Japanese Office Action dated Jul. 8, 2003, with partial English Translation.

* cited by examiner

*Primary Examiner*—Dalzid Singh
(74) *Attorney, Agent, or Firm*—McGinn IP Law Group

(57) ABSTRACT

The output monitor/control device is provided with: Mach-Zehnder circuit 104 that receives a light beam, branches the light beam into two light beams having a phase difference of 180°, and transmits each of the light beams, exhibiting a periodic optical transmittance-optical frequency characteristic a period of a frequency interval corresponding to a predetermined free spectral range; first and second photodiodes that each receive one of two light beams supplied from the Mach-Zehnder circuit; calculation circuit 108 that calculates a predefined discrimination formula for evaluating wavelength change of the light beam based on output currents of the photodiodes; and wavelength control circuit 111 that detects change in wavelength based on the calculation results by the calculation circuit and adjusts the wavelength to a set value. Mach-Zehnder circuit 104 is adjusted in advance such that wavelengths to be controlled are included in a wavelength range that corresponds to the frequency range in which the optical transmittance-optical frequency characteristics curve of the Mach-Zehnder circuit changes steeply. The use of the optical transmittance-optical frequency characteristic of a Mach-Zehnder circuit in a wavelength monitor/control device enables accurate application to a wide range of wavelengths.

17 Claims, 11 Drawing Sheets

US 7,127,183 B2

OUTPUT MONITOR/CONTROL APPARATUS AND OPTICAL COMMUNICATION SYSTEM

BACKGROUND OF THE INVENTION

The present invention relates to wavelength monitoring circuit for monitoring the output of a laser light source and to an optical communication system that uses this wavelength monitoring circuit, and more particularly to a wavelength monitoring circuit for monitoring variation in the wavelength and variation in the output of laser light or for maintaining the wavelength and output level at desired values, and also to an optical communication system.

The rapid popularization in recent years of information communication, of which the Internet is representative, has resulted in the abrupt increase in network traffic, and this increase has raised the demand for trunk networks and access networks having greater capacity. This demand has been met by employing optical fiber communication technology through WDM (wavelength division multiplex) in which a plurality of signals each having a different wavelength are multiplexed on an optical fiber. With the aim of achieving still higher capacity of communication volume, various techniques are being developed for broadening the pass wavelength bandwidth, increasing the number of channel wavelengths, and narrowing the channel wavelength interval. Research and development has been particularly active in wavelength division multiplexing having a high degree of multiplexing, i.e., DWDM (Dense Wavelength Division Multiplexing), for such uses as the trunk line of a network. Development of this type of technology calls for stabilization of the wavelength of the laser light that is used as the signal light.

FIG. 1 shows the typical composition of an arrayed waveguide diffraction grating that is used for obtaining laser light of a plurality of wavelengths separately from a laser light source of particular wavelengths. Arrayed waveguide diffraction grating 11 is made up by: a single or a plurality of input waveguides 12 formed on a substrate (not shown in the figure); a plurality of output waveguides 13; channel waveguide array 14 having differing curvatures in the same direction; input-side slab waveguide 15 for connecting input waveguides 12 to channel waveguide array 14; and output-side slab waveguide 16 for connecting channel waveguide array 14 to output waveguides 13.

The paths of multiplexed signal light that is entered from input waveguides 12 are spread by input-side slab waveguide 15, following which each is directed into channel waveguide array 14 at equal phase. The intensity of entered light is not equal at each incident point of input slab waveguide 15, the intensity increasing towards the central portion of input-side slab waveguide 15 in a substantially Gaussian distribution.

A predetermined difference in the length of the optical path is provided between successive arrayed waveguides that make up channel waveguide array 14: the length of the optical paths are set to successively increase or decrease, so that light beams guided by each of the arrayed waveguides arrive at output slab waveguide 16 with a predetermined phase difference. In actuality, the occurrence of chromatic dispersion causes the equiphasal surface to tilt depending on a wavelength, and the light beams therefore form images (converge) at differing positions depending on a wavelength on the interface of output-side slab waveguide 16 and output waveguide 13. Output waveguide 13 is arranged at positions in accordance with wavelength, and differing wavelength components can therefore be derived from output waveguide 13.

The central wavelength of this type of arrayed waveguide diffraction grating 11 is extremely sensitive to changes in the refractive index of the waveguide material caused by changes in temperature. The wavelength that is derived from output waveguide 13 must therefore be monitored to control temperature so as to prevent variations in wavelength.

We now refer to FIG. 2 in which is shown an example of an output monitor/control device proposed in the prior art. This device is disclosed in Japanese Patent Laid-open No. 31859/99.

In the figure, laser light 21 emitted from laser diode 20 passes through cut-off filter 22 and is incident on beam splitter 23. Light beam 24 that has been transmitted by beam splitter 23 is applied to a measurement device or communication device (not shown in the figure) and used as light having a stabilized wavelength. Light beam 25 reflected by beam splitter 23 is directed to optical bandpass filter 26, this optical bandpass filter 26 being arranged perpendicular to light beam 25. As a result, a part of reflected light beam 25, transmitted by filter 26, impinges on first photo-diode $28_1$ (the transmitted light is denoted as reference numeral 27 in the figure). The remaining light, reflected from filter 26 passes through beam splitter 23 and impinges on second photodiode $28_2$ (the reflected light is denoted as reference numeral 29).

The outputs $31_1$ and $31_2$ of first and second photodiodes $28_1$ and $28_2$ are applied to output-ratio calculation means 32 for calculating the ratio of the outputs $31_1$ and $31_2$. The thus-obtained monitor signal 33 is then applied to wavelength control means 34. Wavelength control means 34 controls the wavelength of emitted light of laser diode 20 to maintain this output ratio at a prescribed value. The wavelength control of the light radiated from laser diode 20 is realized by varying the drive current of laser diode 20 or by altering the ambient temperature.

FIG. 3 shows the wavelength characteristics of each part of the device shown in FIG. 2, (a) showing the wavelength characteristic of cut-off filter 22, (b) showing the transmittance of optical bandpass filter 26, and (c) showing the reflectance of optical bandpass filter 26. Since cut-off filter 22 is a low-cut filter the cut-off wavelength of which is prescribed to be slightly shorter than the central wavelength $\lambda_1$ of band-pass filter 26, the level of the light received by first photodiode $28_1$ varies as shown in FIG. 3(d) The received light level of second photodiode $28_2$ varies as shown in FIG. 3(e). In the figures, $\lambda_2$ denotes a half-value wavelength and $\lambda_3$ denotes a zero-attenuation wavelength on the high-wavelength side of the filter 26. The emitted light wavelengths of laser diode 20 can be controlled by setting the ratio of the outputs of these photodiodes $28_1$ and $28_2$ to a prescribed value.

FIG. 4 shows another device similar to the device shown in FIG. 2. Parts in FIG. 4 identical to those shown in FIG. 2 are identified by the same reference numerals and redundant explanation is omitted. This device is disclosed in Japanese Patent Laid-open No. 022259/2000.

Laser light 21 radiated from laser diode 20 is directed into optical interference filter 41, which is tilted with respect to the optical axis. Transmitted light 42 impinges on first photodiode $28_1$ and reflected light 43 impinges on second photodiode $28_2$.

Outputs $44_1$ and $44_2$ of first and second photodiodes $28_1$ and $28_2$ are supplied to output ratio calculation means 32 and the output ratio is calculated. Thus obtained monitor signal 45 is applied to wavelength control means 34. Control of the emitted wavelength of laser diode 20 is implemented such that the output ratio is maintained at a prescribed value.

We now refer to FIG. 5, in which is shown the principal components of a device that employs an etalon for monitoring and controlling wavelength. This device is disclosed in Japanese Patent Laid-open No. 223761/2000.

Laser light 21 radiated from laser diode 20 is branched by first beam sampler 51 to make two branched beams 52 and 53 having a small angle with each other. These branched beams 52 and 53 are directed into etalon 54 and received at photodiodes $55_1$ and $55_2$. The outputs of photodiodes $55_1$ and $55_2$ have a wavelength-current characteristic in which the phases are shifted with respect to each other. Calculation unit 56 normalizes the wavelength-current characteristic and uses the portion of the wavelength-current curve that has good linearity to calculate a wavelength deviation from the reference wavelength.

The transmitted light 57 through first beam sampler 51 is incident on second beam sampler 58 to similarly obtain two branched beams 61 and 62 having a small angle with each other. One of the branched beams 61 is received as is by third photodiode $55_3$. The other branched beam 62 is received by fourth photodiode $55_4$ after passing through slope filter 64. Calculation unit 56 finds the reference wavelength of the incident beam from the wavelength-transmittance characteristic of slope filter 64. Calculation unit 56 obtains an accurate wavelength of irradiated laser light 21 by adding this reference wavelength and the wavelength deviation.

Of these examples of output monitor/control devices of the prior art, the devices shown in FIG. 2 and FIG. 4 control the wavelength of laser light by adjusting the ratio of the outputs $31_1$ and $31_2$, or $44_1$ and $44_2$ of two photodiodes $28_1$ and $28_2$ to a prescribed value. As a result, there is the problem that the control of laser light wavelength is restricted only within a narrow wavelength range in which the characteristics curves of outputs complementarily change according to the slopes in opposite directions, as shown in (d) and (e) of FIG. 3. Taking the example shown in FIG. 2 and FIG. 3 to further explain this point, the wavelength range in which control is possible when using cut-off filter 22 as shown in (a) of FIG. 3 is limited to wavelengths that are longer than λ1. This is because inclusion of shorter wavelengths results in the existence of two wavelengths that take the same ratio (λ2 and a wavelength that is symmetrical to λ2 with respect to λ1), and control to a specific wavelength is therefore not possible.

While wavelengths are restricted to longer wavelengths than λ1 in the device shown in FIG. 2, control of wavelengths in the range longer than wavelength λ3 is disabled because the transmittance of optical bandpass filter 26 substantially reaches a minimum as the wavelength approaches wavelength λ3 at which reflectance falls off to substantially zero. Of course, the wavelength range between the two wavelengths λ1 and λ3 can be somewhat extended by selecting the characteristics of optical bandpass filter 26. When this wavelength range is extended, however, the slopes of the transmittance and reflectance curves of optical bandpass filter 26 become relatively gentle and the change in the outputs $31_1$ and $31_2$ of the two photodiodes $28_1$ and $28_2$, respectively, versus change in wavelength becomes smaller, thereby resulting in deterioration in the accuracy for controlling wavelength to a desired value.

In order to solve the above-described problem regarding the restricted wavelength range of control, means such as the arrayed waveguide diffraction grating shown in FIG. 1 can be employed to individually control the wavelengths of optical signals over a wide range of wavelengths. Such a solution, however, entails the use of a number of output monitor/control devices each having a characteristic constitution for a wavelength band, and this approach has the problems of the considerable time required for development as well as the difficulty of reducing the cost of the device.

On the other hand, a wavelength monitor/control device that employs an etalon such as shown in FIG. 5 does not suffer from this problem and is capable of accurate processing over a relatively wide range of wavelengths. The device shown in FIG. 5, however, employs two beam samplers 51 and 58 and entails an increase in the number of other parts that accompanies the use of these components. As a consequence, such a device has the problems of increased bulk as well as the difficulty in reducing the cost of the device.

It is an object of the present invention to provide an output monitor/control device which by itself can be applied with high accuracy to a relatively wide range of wavelengths, allowing a simplified device architecture.

It is another object of the present invention to provide an output monitor/control device that can handle a large number of wavelengths with basically the same constitution.

It is further object of the present invention to provide an optical communication system employing such an output monitor/control device.

SUMMARY OF THE INVENTION

To achieve the above-described objects, the output monitor/control device of the present invention is provided with:

a Mach-Zehnder circuit that receives a light beam, branches the light beam into two light beams having a mutual phase difference of 180°, and transmits each of the light beams exhibiting a periodic optical transmittance-optical frequency characteristic with a period of a frequency interval corresponding to a prescribed free spectral range;

first and second photoelectric conversion means each for receiving a respective one of two light beams that have emerged from the Mach-Zehnder circuit;

a calculation means for calculating a predefined discrimination formula for evaluating a wavelength change in each of the optical beams based on conversion outputs of the first and second photoelectric conversion means, wherein said conversion outputs change responsively to a wavelength change in accordance with the optical transmittance-optical frequency characteristic; and a wavelength control means for detecting changes in wavelength based on the calculation results of the calculation means and adjusting the wavelength to a preset value.

As is well known, the optical transmittance-optical frequency characteristic of light that has been transmitted by a Mach-Zehnder circuit changes periodically. The period of transmittance in this characteristics curve is referred to as the free spectral range (FSR). In other words, if the incident light intensity is constant, a Mach-Zehnder circuit emits light of equal intensity for every frequency interval equal to the FSR.

The transmittance-frequency characteristics of two light beams transmitted by a Mach-Zehnder circuit have a phase difference of 180°. Thus, if the intensity of light introduced into a Mach-Zehnder circuit is constant, the sum of the intensities (levels) of the two light beams transmitted by the Mach-Zehnder circuit is uniform regardless of the frequency. As will be explained hereinbelow, this property can be used for controlling the intensity of the input light.

The wavelength control of the present invention is effected by using the transmittance-optical frequency characteristic of the Mach-Zehnder circuit. To raise the accuracy of the wavelength control, a operation point of control is set in the wavelength region of the transmittance-optical frequency characteristic curve in which the slope of the transmittance-optical frequency characteristic curve of the Mach-Zehnder circuit is steepest, i.e., the wavelength region in which the slightest change in wavelength brings about the largest change in transmitted light intensity.

In the present invention, an optical signal supplied to a Mach-Zehnder circuit preferably has a wavelength defined as a standard wavelength of the ITU (International Telecommunication Union) grid. In this case, the Mach-Zehnder circuit is constituted such that the standard wavelength falls in a wavelength region in which the slope of the transmittance-optical frequency characteristic curve is steepest.

The first and second photoelectric conversion means, when each receiving a respective one of the two light beams that have been branched by the Mach-Zehnder circuit, provide output currents having an photocurrent-optical frequency characteristic that behaves similarly to the transmittance-optical frequency characteristic. Thus, the Mach-Zehnder circuit constituted as described above allows a large photocurrent change to be caused for a small change in wavelength of an incident optical signal.

Because the photocurrent-optical frequency characteristics of the first and second photoelectric conversion means have a 180° phase difference, the two photocurrents caused by the first and second photoelectric conversion means have a common wavelength region that exhibits a steep change.

The calculation means substitutes the photocurrent values supplied from the first and second photoelectric conversion means into a predetermined discrimination formula with the passage of time. The wavelength control means detects the value and direction of wavelength change based on the calculation results obtained by the calculation means and adjusts the wavelength to a preset value.

As described hereinabove, while the conversion outputs (photocurrents) of the first and second photoelectric conversion means each vary periodically depending on frequency with reverse phases, the sum of these outputs is constant regardless of frequency. Taking advantage of this property, the above-described discrimination formula can be defined as a ratio of the sum of the conversion outputs and a quantity other than the sum, derivable from the conversion outputs. In this formulation, the sum is preferably used as a normalization constant.

The above-described discrimination formula, can preferably be the ratio of the sum of the conversion outputs of the first and second photoelectric conversion means and either one of the conversion outputs of the first and second photoelectric conversion means.

The difference between the conversion outputs of the first and second photoelectric conversion means can preferably be taken as a quantity other than the sum. By using this difference, the capability of detecting a wavelength change can be effectively doubled.

Since the conversion outputs of the first and second photoelectric conversion means exhibit a periodic variation, output monitor/control devices of basically the same constitution can therefore be used for a comparatively wide range of wavelengths or for multiplexed wavelengths.

The output monitor/control device of the present invention may further be provided with a level control means for adjusting intensity of the light that has emerged from said Mach-Zehnder circuit based on a change in said sum of the conversion outputs calculated preferably by said calculation means.

It is to be noted that the above-described examples of the discrimination formula for detecting a wavelength change is predicated on that the sum of the conversion outputs of the first and second photoelectric conversion means is constant.

As a result, adjustment of the sum of the conversion outputs to a preset value is required for evaluating the wavelength change according to said discrimination formula.

In the output monitor/control device of the present invention, the Mach-Zehnder circuit can preferably be constituted such that the free spectral range is equal to the frequency period that corresponds to the interval of the standard wavelengths prescribed as the ITU grid. In this way, the output monitor/control device of the present invention can be used in communication that conforms to ITU (International Telecommunication Union) regulations. The optical communication system of the present invention is provided with:

an optical transmission means that transmits an optical signal of a plurality of wavelengths in parallel;

a multiplexer provided with an arrayed waveguide diffraction grating to perform wavelength division multiplexing of optical signals of each wavelength transmitted by the optical transmission means;

an optical transmission path for carrying the multiplexed optical signals provided by the multiplexer;

nodes arranged as appropriate midway on this optical transmission path;

a demultiplexer having an arrayed waveguide diffraction grating for receiving the multiplexed optical signal transmitted by way of the optical transmission path and by way of the nodes, and demultiplexing the optical signal into optical signals of each wavelength; and an optical receiver for receiving the demultiplexed optical signals of each wavelength; wherein the optical transmission means and the nodes each have an output monitor/control devices; each of the output monitor/control device being provided with:

an arrayed waveguide diffraction grating for receiving a wavelength-division-multiplexed optical signal and generates demultiplexed optical signals;

Mach-Zehnder circuits each of which receives the demultiplexed optical signal, branches the demultiplexed optical signal into two light beams having a phase difference of 180°, and supplies each of these light beams exihibiting a periodic optical transmittance-optical frequency characteristic having a period of a frequency interval corresponding to a predetermined free spectral range;

sets of a first and second photoelectric conversion means each set for receiving a respective one of the two light beams provided from the Mach-Zehnder circuit;

calculation means each for calculating a predefined discrimination formula for evaluating changes in wavelength of the demultiplexed optical signals based on the conversion outputs of the first and second photoelectric conversion means, said conversion outputs each varying in accordance with the optical transmittance-optical frequency characteristic; and a wavelength control means for detecting changes in wavelength based on the calculation results obtained by the calculation means and adjusting wavelength to a preset value.

In this way, efficient and reliable communication can be realized by providing an output monitor/control device of the present invention for each channel. In addition, circuit devices for controlling wavelength have the same constitution for each wavelength and are thus amenable to mass production, thereby not only enabling realization of a system at low cost, but simplifying management and maintenance of components.

A package on which are mounted a Mach-Zehnder circuit element and two photodiodes for receiving two light beams supplied from the Mach-Zehnder circuit element can be laid out as follows:

a Peltier element of substantially the same area as the Mach-Zehnder circuit is mounted on a substrate;

a copper plate for thermal exchange between the Peltier element and Mach-Zehnder circuit element having substantially the same area as the Peltier element is arranged on the Peltier element, a trench for receiving a temperature detector for measuring the temperature of the Mach-Zehnder circuit is provided on the surface of the copper plate, and a temperature detector is embedded in the trench;

a Mach-Zehnder circuit element is arranged on the copper plate;

a photodiode-mounting submount is arranged on the substrate in the vicinity of the output area of the Mach-Zehnder circuit, the two photodiodes are secured onto the submounts, and lead wires for leading out the output currents of the photodiodes are led from the submounts to an external circuit;

a drive submount is provided on the substrate, lead wires for driving the Peltier element are led from an external circuit by way of the drive submount and connected to the Peltier element, and lead wires for deriving temperature detection signals from the temperature detector element to an external circuit are led by way of the drive submount; and an optical fiber for carrying an optical signal is attached to the substrate, one end of the optical fiber being connected to the input portion of the Mach-Zehnder circuit.

The Mach-Zehnder circuit may be a single-sided interferometer.

While the Mach-Zehnder circuit need not be limited to a single-sided interferometer, the use of a single-sided interferometer in which the output end as well as the input end is arranged at the end portions on the same side of the circuit can provide a more compact module. In addition, because a difference in the lengths of optical paths between the input and output terminals is obtained at the sections that are bent in an R shape, a single-sided Mach-Zehnder circuit enables a more compact element than a configuration in which the input end and output terminals are arranged on different sides of the substrate. This not only allows an increase in the yield of elements that can be fabricated from one wafer but contributes to a reduction in cost.

The above and other objects, features, and advantages of the present invention will become apparent from the following description referring to the accompanying drawings, which illustrate examples of preferred embodiments of the present invention.

DETAILED DESCRIPTION OF THE PREFERRED EMBODIMENTS

Embodiments of the present invention are next described in detail with reference to drawings.

Figure 6:
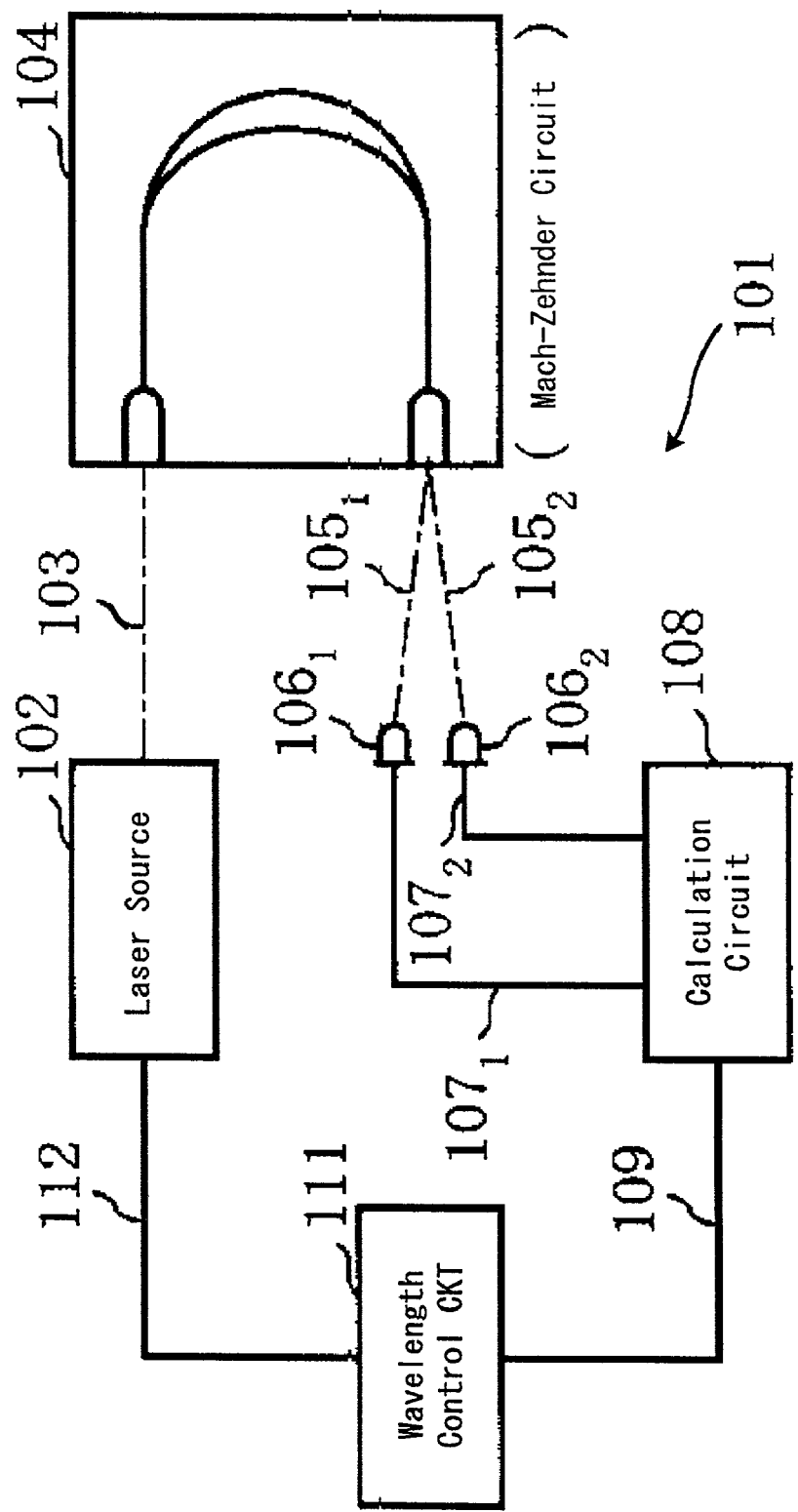
FIG. 6 is a schematic structural view showing the composition of the first embodiment of the output monitor/control device of the present invention.

We now refer to FIG. 6, in which is shown the configuration of a first embodiment of the output monitor/control device according to the present invention. Output monitor/control device 101 is provided with: laser light source 102, Mach-Zehnder circuit 104, photodiodes $106_1$ and $106_2$, calculation circuit 108, and wavelength control circuit 111.

Mach-Zehnder circuit 104 receives laser light 103 emitted from laser light source 102, branches the received light into two light beams having a phase difference of 180°, and provides branched light beams $105_1$ and $105_2$ as outputs. Photodiodes $106_1$ and $106_2$ receive light beams $105_1$ and $105_2$, respectively.

Calculation circuit 108 receives respective outputs $107_1$ and $107_2$ of photodiodes $106_1$ and $106_2$ and executes a calculation as will be described hereinbelow. Wavelength control circuit 111 receives calculation result 109 of calculation circuit 108 and generates control signal 112 for controlling the wavelength of laser light source 102. The control of wavelength can be realized through the control of control signal 112 by varying the drive current of the laser diode that constitutes laser light source 102 or by varying the ambient temperature.

Figure 1:
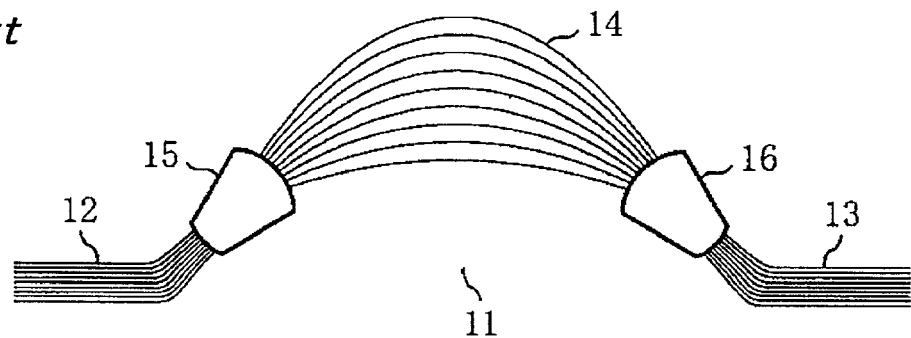
FIG. 1 is a plan view showing the overall configuration of an arrayed waveguide diffraction grating of the prior art.
Figure 2:
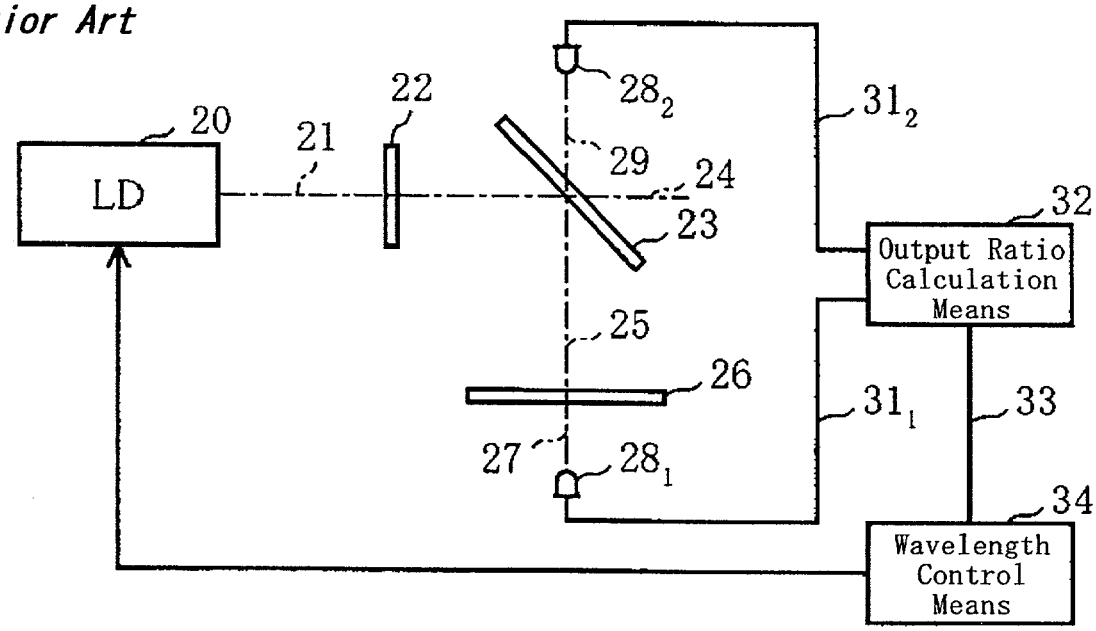
FIG. 2 is a block diagram showing an example of an output monitor/control device of the prior art.
Figure 3:
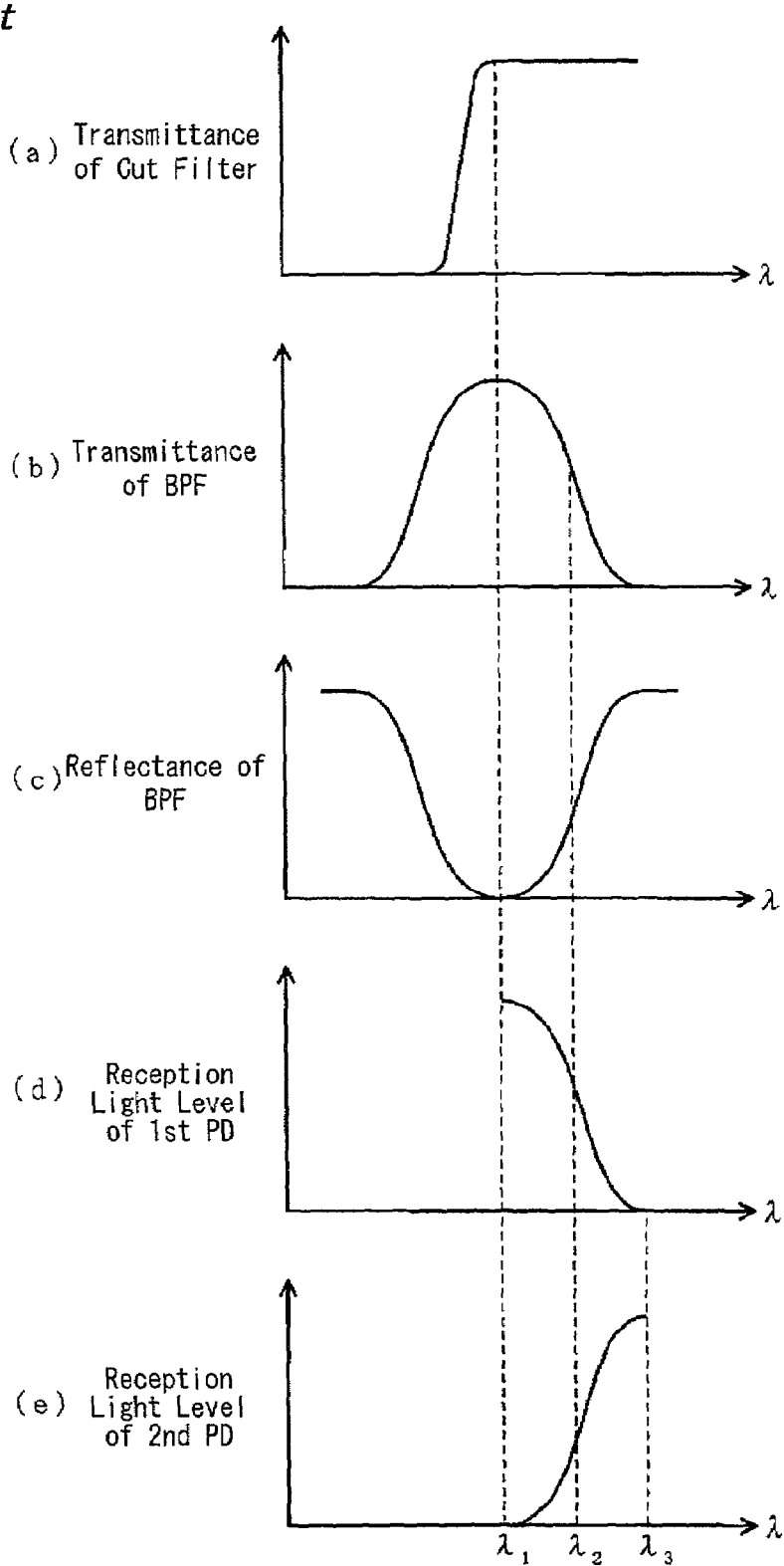
FIG. 3 shows the wavelength characteristics of each part of the device shown in FIG. 2.
Figure 4:
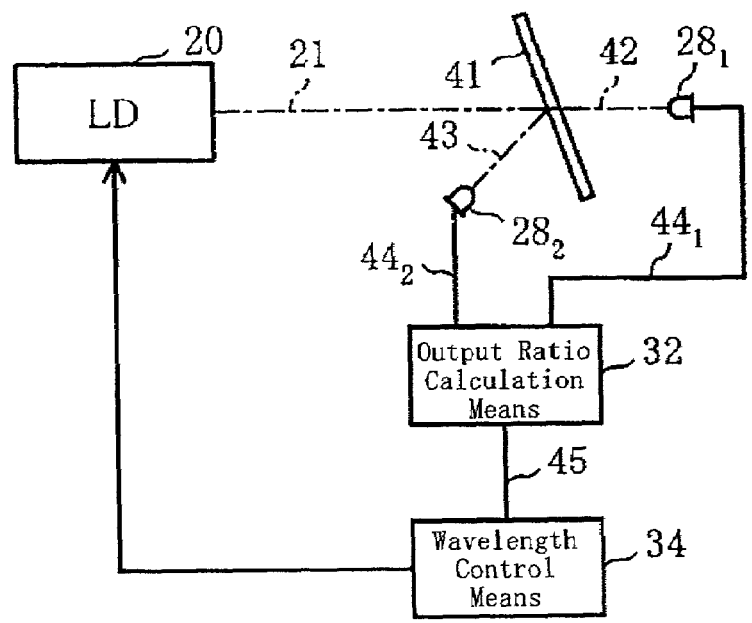
FIG. 4 is a block diagram showing another device similar to the device of FIG. 2.
Figure 5:
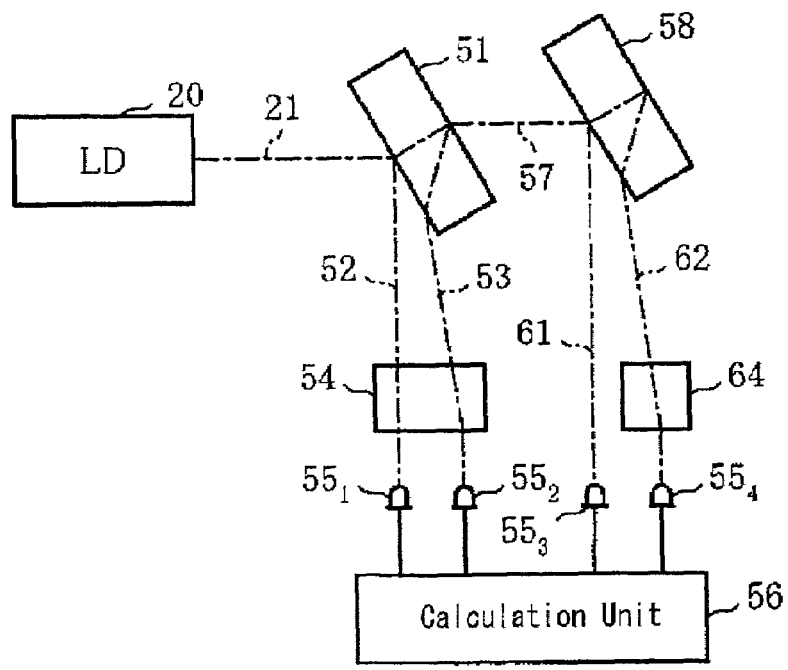
FIG. 5 is a schematic structural diagram showing the principal elements of a device of the prior art that monitors and controls wavelength using an etalon.

Although Mach-Zehnder circuit 104 of a single-sided interferometer type is used in the embodiment of FIG. 6, Mach-Zehnder circuit 104 need not be limited to a single-sided type. A single-sided interferometer, however, allows the input terminal and output terminal to be arranged on the same side of the gauge. Thus a more compact module can be provided than in the case of a both-sided type, in which the input terminal and the output terminal are arranged on the different sides such as shown in FIG. 1.

In addition, since the optical path difference of the two light beams is provided by bending the optical paths in an R-shape, the single-sided configuration enables a more compact device than the both-sided configuration.

Figure 7:
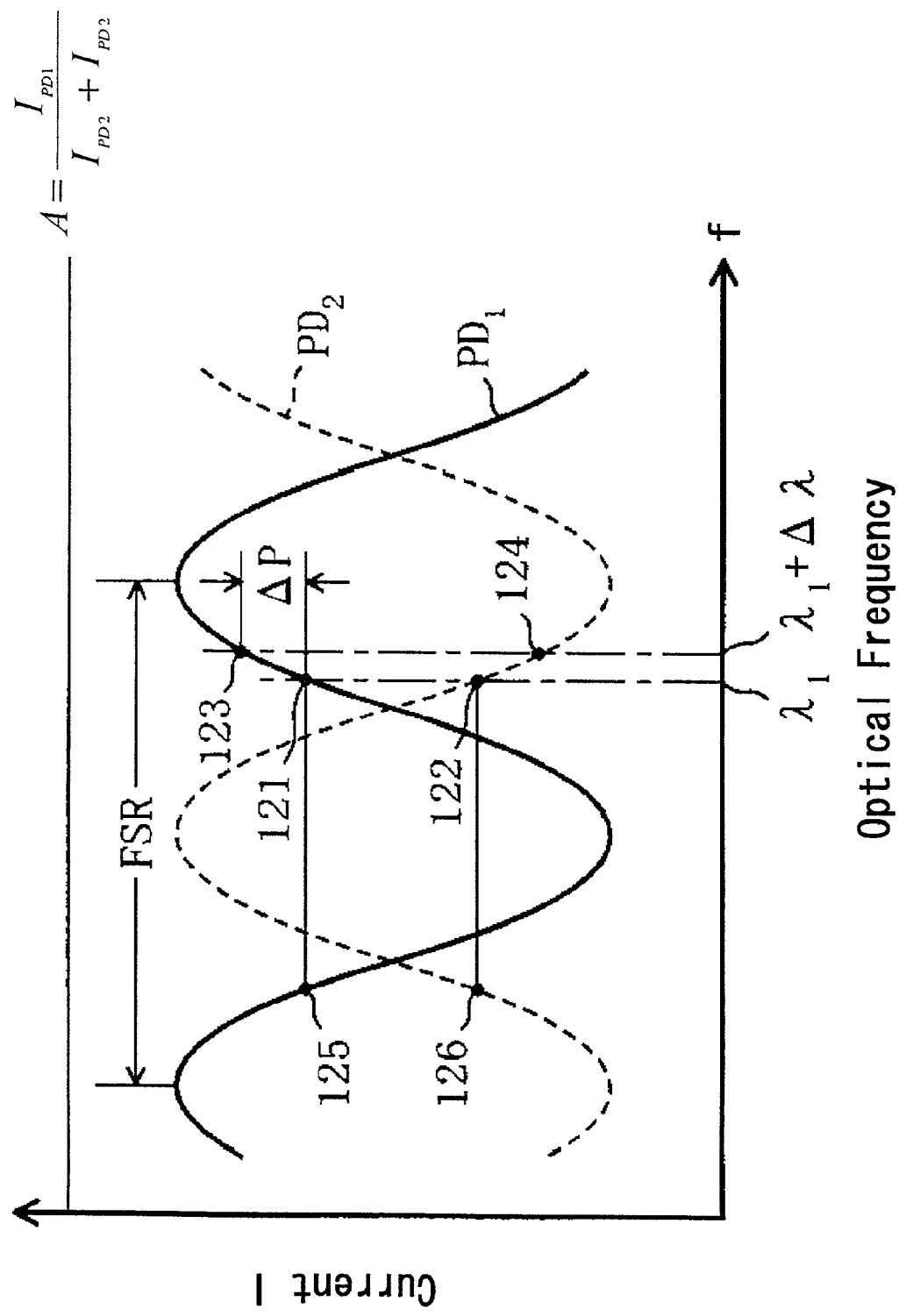
FIG. 7 is an explanatory view showing the relation between the photocurrent and optical frequency supplied from the first and second photodiodes.

FIG. 7 shows the photocurrent-optical frequency characteristic of the output photocurrents I of photodiodes $106_1$ and $106_2$. The output current value $107_1$ of photodiode $106_1$ exhibits, with respect to the optical frequency, a sine wave having a period equal to the Free Spectral Range (hereinbelow abbreviated as "FSR") that corresponds to one period of the loss-wavelength characteristic. Output current value $107_2$ of photodiode $106_2$ also exhibits a similar variation in a form in which the phase is shifted 180°. In this embodiment, the Mach-Zehnder circuit is designed such that the FSR is equal to the frequency interval that corresponds to the interval of a standard wavelength defined as the ITU (International Telecommunication Union) grid.

The phases in the photocurrent-optical frequency characteristics of output currents $107_1$ and $107_2$, respectively, of photodiodes $106_1$ and $106_2$ differs by 180°. The sum of these current values is therefore always constant regardless of the optical frequency.

Calculation circuit 108 calculates ratio A of output current value $I_{PD1}$ of photodiode $106_1$ to the sum of these current values $I_{PD1}$ and $I_{PD2}$. This can be represented by formula (1) below.

$$A = \frac{I_{PD1}}{I_{PD1} + I_{PD2}} \quad (1)$$

The wavelength of the light beam supplied from laser light source 102 can be controlled to a desired value by supplying control signal 112, which is adjusted such that the value A is always a prescribed value, to laser light source 102.

It is to be noted that, since the two current values $I_{PD1}$ and $I_{PD2}$ change periodically within a frequency range broader than the FSR, the wavelength of the laser light source can be adjusted to a desired value within the broad range of wavelengths, in contrast with the prior art.

For example, adjusting the temperature of laser light source 102 to t1 enables the output of laser light 103 to have optical frequency f1 while maintaining this output at optical frequency f1 by means of the above-described technique of the present invention. Alternately, laser light 103 of another optical frequency f2 can be provided while maintaining this laser light 103 at optical frequency f2 by adjusting the temperature of laser light source 102 to another temperature t2 by using the above-described technique of the present invention.

The interval of the frequencies f1 and f2 is arbitrary in principle in the present invention.

In particular, accurate wavelength control can be achieved by setting the optical frequency to be controlled to any position at which the slopes of the current-frequency characteristic curves shown in FIG. 7 are steep.

As an example, let λ1 denote the wavelength to be subject to control; points 121 and 122 denote the operation points on the curves representing current values $I_{PD1}$ and $I_{PD2}$ at wavelength λ1; and points 123 and 124 denote points on the curves representing current values $I_{PD1}$ and $I_{PD2}$ at wavelength (λ1+Δλ), Δλ being a wavelength variation.

Then, the variation in A of the previously described formula (1) caused by a wavelength variation from wavelength λ1 to wavelength λ1+Δλ is $\Delta P/(I_{PD1}+I_{PD2})$, where ΔP is the difference between the current values for the two points 121 and 123. Laser light 103 can be adjusted to wavelengths λ1 with high accuracy because the difference P is a relatively large value at points where the slopes of the curves at current values $I_{PD1}$ and $I_{PD2}$ are steep.

In addition, as can be clearly seen from the four points 121–124 of FIG. 7, wavelength control can also be realized using various formulas other than formula (1). For example, detection of variation in wavelength and adjustment of the wavelength to a prescribed wavelength can be attained by using the other current value $I_{PD2}$ in place of current value $I_{PD1}$ for the numerator of formula (1). Alternatively, the difference between $I_{PD1}$ and $I_{PD2}$ can be used in place of current value $I_{PD1}$ for the numerator of formula (1). This approach has the advantage of doubling the sensitivity of detecting changes in wavelength.

Furthermore, as shown in FIG. 7, one period (FSR) of the sine wave has two points of the same current value such as points 125 and 121 or 126 and 122. Since the two points have different phases of the photocurrent-optical frequency curve, however, an increase or decrease in wavelength Δλ results in opposite signs for the two points. In other words, the variations of the numerator of formula (1) for the two points have the opposite signs, yielding different calculation results. The different calculation results allow a specific wavelength to be controlled within the FSR wavelength range.

Figure 8:
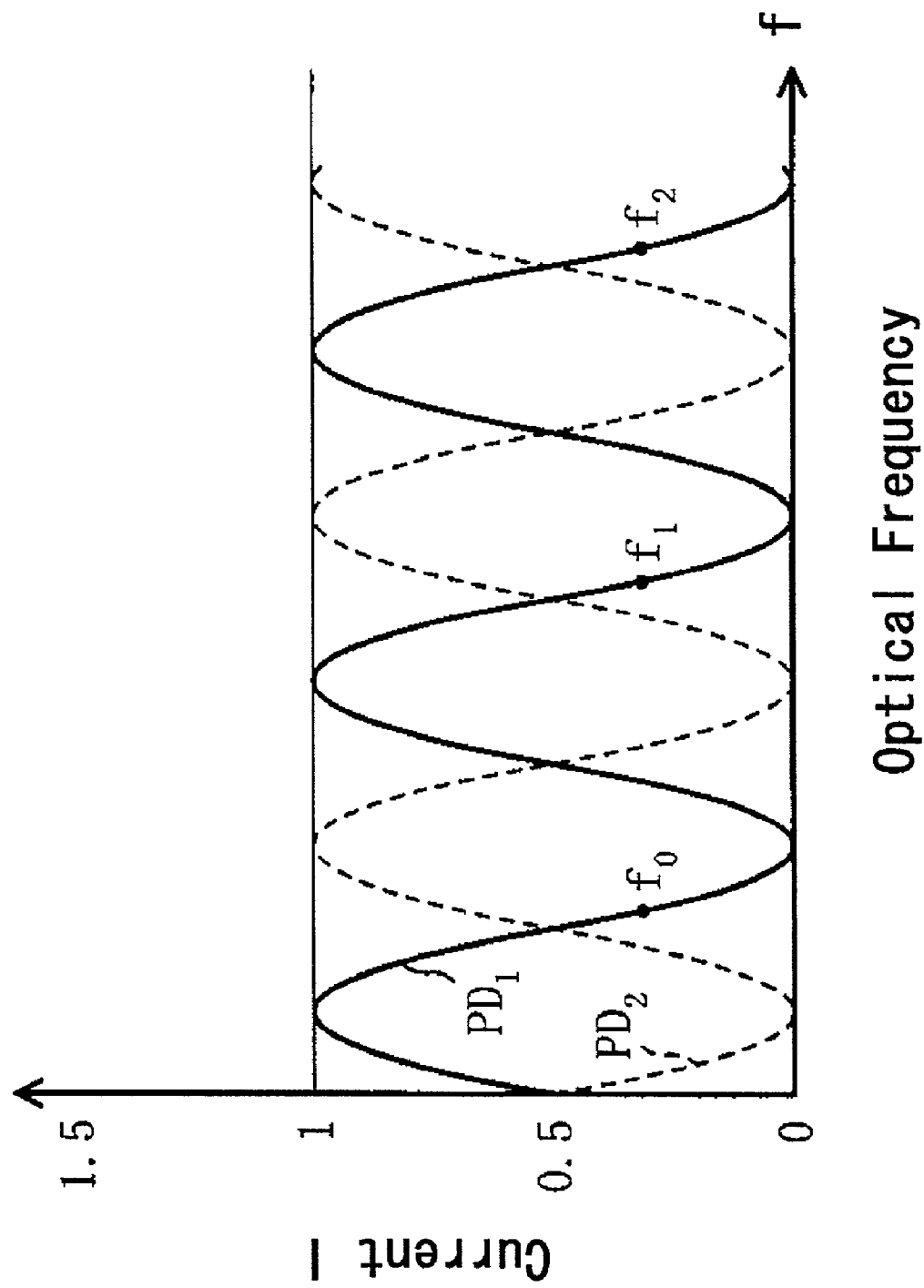
FIG. 8 is an explanatory view showing a plurality of periods of the photocurrent-optical frequency characteristic curve of FIG. 7.

FIG. 8 shows a curve representing a plurality of periods of photocurrent-optical frequency characteristics. The vertical axis represents current values of $I_{PD1}$ and $I_{PD2}$ normalized to 1, and the horizontal axis represents optical frequency. As has already been explained, the curves that represent current values IPD1 and IPD2 are sinusoidal and continuous over a plurality of periods. Accordingly, the optical frequency fn at which the current value and the differential coefficient of the current value with respect to optical frequency dI/df are equal to those at optical frequency f0 is as shown in the following formula:

$$fn = f0 \pm nFSR \quad (2)$$

where n is an integer.

As an example, prescribing FSR to be 50 GHz and setting optical frequency f0 to a frequency corresponding to any ITU grid wavelength cause current values IPD1 and IPD2 and their differential coefficients dI/df to exhibit the same values at optical frequencies f1, f2 . . ., the interval of which is 50 GHz corresponding to the ITU grid spacing. The wavelength adjustment operation is therefore possible at any ITU Grid wavelength.

In the foregoing explanation, a device was described that fixes a wavelength or an oscillator frequency at a desired value by implementing control through detection of variation in the oscillation frequency by means of calculation circuit 108 and through compensation for the detected variation by means of wavelength control circuit 111. The output monitor/control device of this embodiment is further capable of correcting output intensity variation of laser light 103 as described below.

When the output of laser light 103 emitted from laser light source 102 varies, and as a consequence, the outputs $107_1$ and $107_2$ of first and second photodiodes $106_1$ and $106_2$ vary, the sum of current values $I_{PD1}$ and $I_{PD2}$ also varies. This variation can therefore be checked in the process of calculating the denominator of formula (1). Variation in the output level is thus detected and the variation in the light level is corrected by implementing control to maintain this (denominator (IPD1+IPD2)) at a fixed value.

Explanation next concerns the optical communication system of the present invention.

In the previously described embodiment, explanation regarded the monitoring and control of wavelength for a case in which laser light of a single wavelength is supplied from laser light source 102. The output monitor/control device of the present invention, however, is a device with broad applicability capable of dealing with a plurality of wavelengths and not only a single wavelength. The present invention is therefore capable of application to control in a dense wavelength division multiplexing optical communication system by providing a plurality of devices each to deal with different wavelengths.

Figure 9:
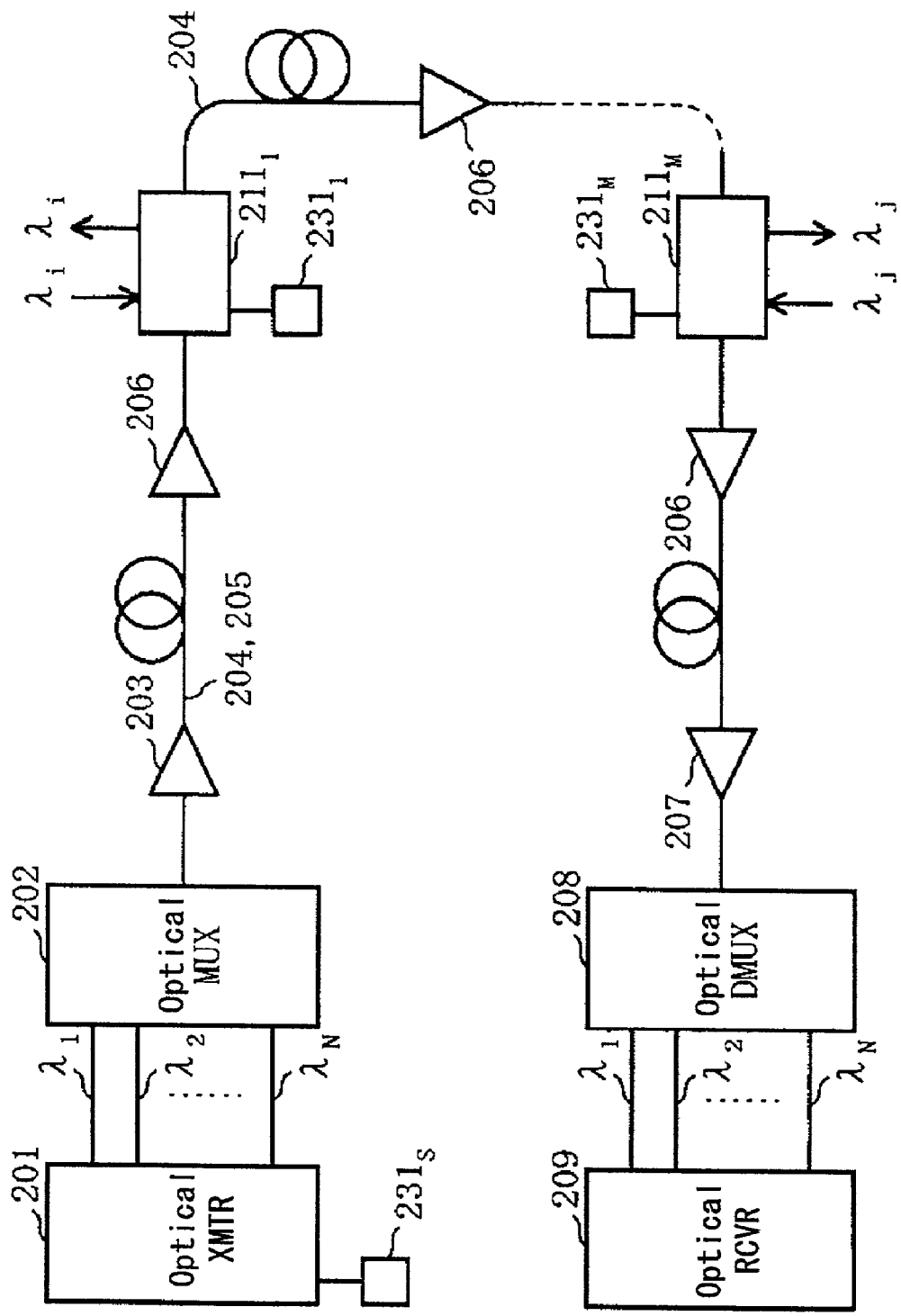
FIG. 9 is a system configuration view showing the principal elements of the configuration of an embodiment of the optical communication system of the present invention.

FIG. 9 shows the principal elements of the architecture of an optical communication system of the present invention. This optical communication system multiplexes, by optical multiplexer (MUX) 202, optical signals of N channels of wavelengths λ1~λN that have been sent from optical transmitter 201, which is connected to a SONET (Synchronous Optical Network) device (not shown in the figure) arranged on the transmission side. Booster amplifier 203 amplifies the multiplexed signal, and then sends the amplified signal to optical transmission path 204.

Optical multiplexer 202 is constituted by an arrayed waveguide diffraction grating (AWG) such as shown in FIG. 1. Multiplexed optical signal 205 is amplified as appropriate by in-line amplifier 206, and then passes by way of preamplifier 207, and demultiplexed into the original wavelengths $\lambda_1 \sim \lambda_N$ by optical demultiplexer (DMUX) 208. Finally, the demultiplexed signal is received at optical receiver 209. A number of nodes (OADM) $211_1 \sim 211_M$ are arranged midway on this optical transmission path 204. Optical signals of desired wavelengths are received and supplied at these nodes $211_1 \sim 211_M$. In the figure, devices $231_S$, $231_1$, and $231_M$ are output monitor/control devices of the present invention arranged at optical transmitter 201, node $211_1$, and node $211_M$, respectively, and details of these components are explained hereinbelow.

Figure 10:
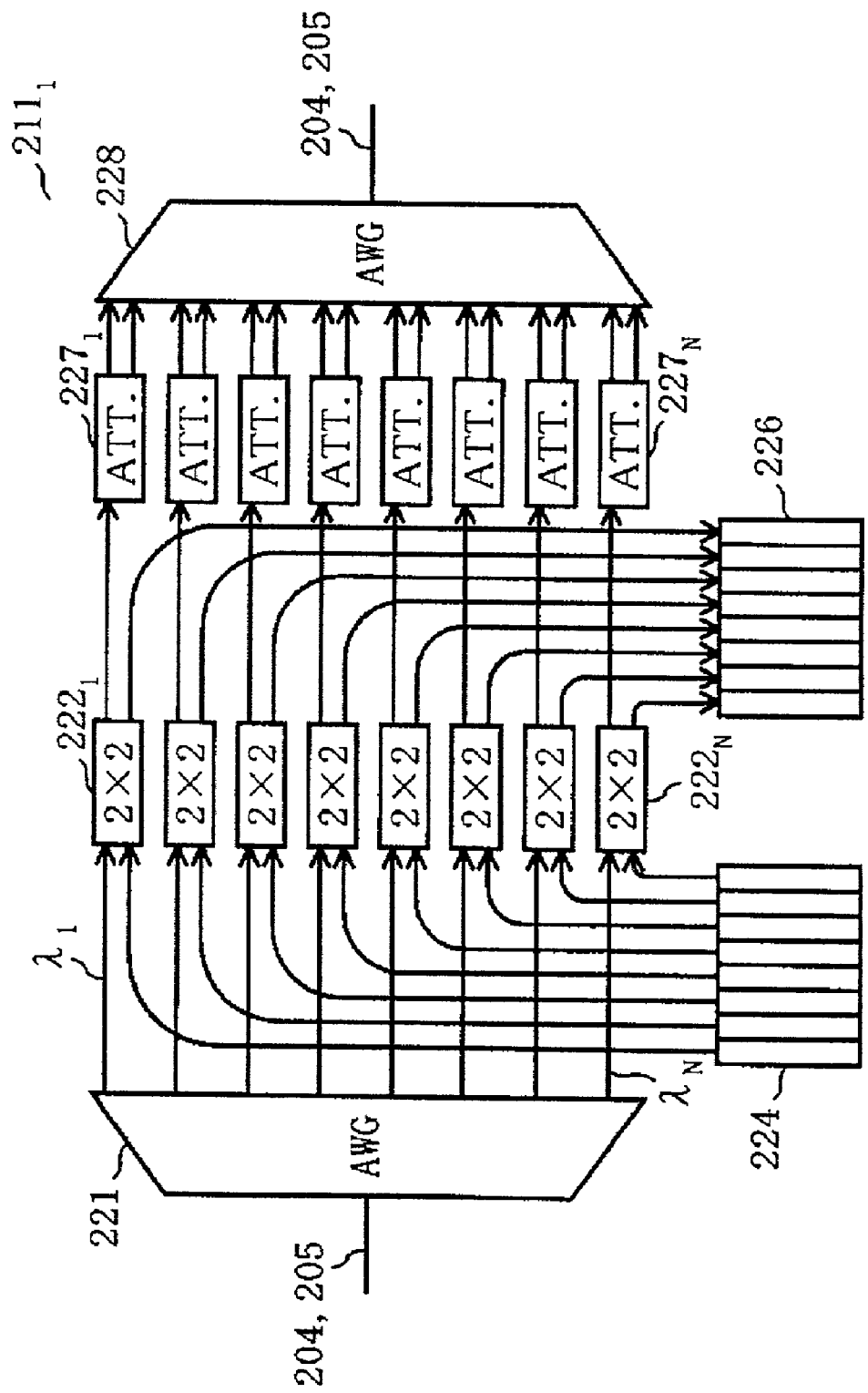
FIG. 10 is a block diagram showing the principal elements of the configuration of a node used in the optical communication system of FIG. 9.

FIG. 10 gives a schematic representation of the configuration of a node. The figure shows first node $211_1$, but the other second to Mth nodes $211_2 \sim 211_M$ have basically the same configuration. Optical transmission path 204 shown in FIG. 10 is connected to input-side arrayed waveguide diffraction grating (AWG) 221 of node $211_1$, where it is branched into optical waveguides of N channels of wavelengths $\lambda_1 \sim \lambda_N$; the optical signals of each of wavelengths $\lambda_1 \sim \lambda_N$ are dropped into node-side receivers 226 by 2-input 2-output optical switches $222_1 \sim 222_N$ provided for each of wavelengths $\lambda_1 \sim \lambda_N$; and optical signals that are transmitted from node-side transmitters 224 are added to optical transmission path 204. On the output side of 2-input 2-output optical switches $222_1 \sim 222_N$, gain is adjusted by respectively provided attenuators (ATT) $227_1 \sim 227_N$, following which the signals are applied to output-side arrayed waveguide diffraction grating 228.

Output-side arrayed waveguide diffraction grating 228 is an element having a configuration that is the reverse of input-side arrayed waveguide diffraction grating 221, whereby optical signals of the N channels of wavelengths $\lambda_1 \sim \lambda_N$ are multiplexed and sent as optical signal 205 to optical transmission path 204.

An arrayed waveguide diffraction gratings is employed in any of first node $211_1$ shown in FIG. 10, and second to Mth nodes $211_2 \sim 211_M$ shown in FIG. 9, as well as in optical multiplexer 202 and optical demultiplexer 208. Thus, the trend toward larger numbers N of channels of optical signal 205 raises the importance of stabilization and monitoring of output level of each signal wavelength derived in multi-channels from output-side slab waveguide 16 (refer to FIG. 1) of the arrayed waveguide diffraction grating. Thus, as shown in FIG. 9, output monitor/control devices $231_1 \sim 231_M$ and $231_S$ are connected to each of these components $211_1 \sim 211_M$ and optical transmitter 201, respectively.

Figure 11:
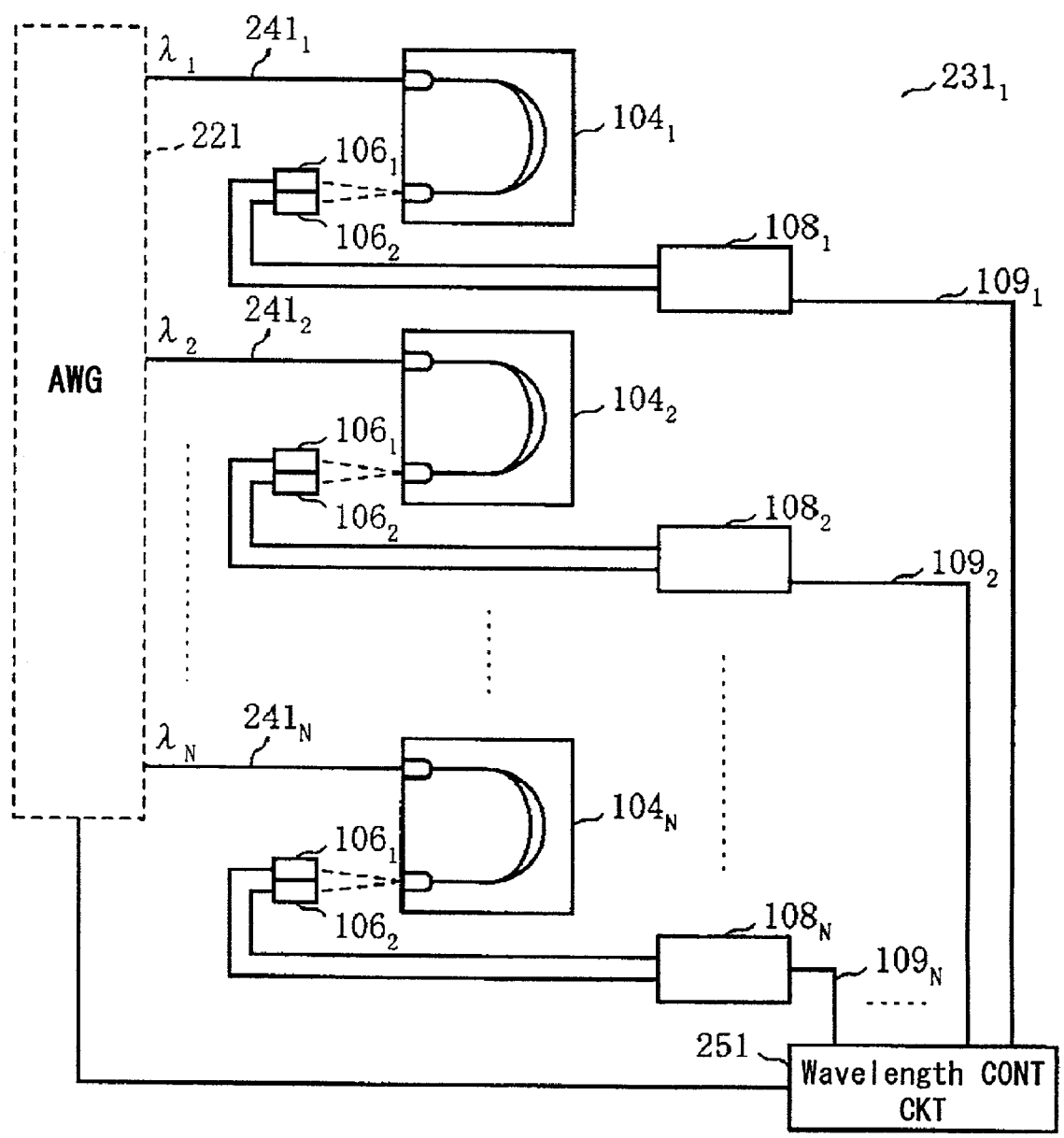
FIG. 11 is a block diagram showing the principal elements of the configuration of an output monitor/control device used for the optical communication system of the present invention.

FIG. 11 gives a schematic representation of the configuration of the output monitor/control device used in an optical communication system of the present invention. Although output monitor/control device $231_1$ is shown in this embodiment, the configuration of the other output monitor/control devices $231_2 \sim 231_M$ and $231_S$ as well is essentially identical.

Output monitor/control device $231_1$ is provided with first to Nth Mach-Zehnder circuits $104_1 \sim 104_N$ having the same composition as Mach-Zehnder circuit 104 (refer to FIG. 6) in the first embodiment. Each of these Mach-Zehnder circuits receives one of optical signals $241_1 \sim 241_N$ of wavelengths $\lambda_1 \sim \lambda_N$, respectively, supplied for monitoring from input-side arrayed waveguide diffraction grating (AWG) 221 shown in FIG. 10. First and second photodiodes $106_1$ and $106_2$ having the same composition as shown in FIG. 6 are arranged on the output side of each of first to Nth Mach-Zehnder circuits $104_1 \sim 104_N$, the output currents of these photodiodes are each applied to a corresponding one of first to Nth calculation circuits $108_1 \sim 108_N$, and calculation is carried out as in the first embodiment.

Optical signals each having a different wavelength $\lambda_1 \sim \lambda_N$ are applied to first to Nth Mach-Zehnder circuits $104_1 \sim 104_N$, respectively. As explained with reference to FIG. 7, each of these Mach-Zehnder circuits $104_1 \sim 104_N$ is adjusted in advance such that the transmittance characteristic of the light transmitted by the Mach-Zehnder circuit changes steeply at the corresponding wavelength. This type of adjustment can be realized by, for example, controlling the substrate temperatures of Mach-Zehnder circuits $104_1 \sim 104_N$ to a respectively proper temperature to change thermally the refractive index of a refractive index modification means of each Mach-Zehnder circuit.

First to Nth calculation circuits $108_1 \sim 108_N$ corresponding to first to Nth Mach-Zehnder circuit $104_1 \sim 104_N$ calculate the ratio A of the sum of current values $I_{PD1}$ and $I_{PD2}$ and the photocurrent $I_{PD1}$ of first photodiode $106_1$.

Calculation results $109_1 \sim 109_N$ that are provided from first to Nth calculation circuits $108_1 \sim 108_N$, respectively, are applied to wavelength control circuit 251. Control of wavelength for input-side arrayed waveguide diffraction grating 221 is carried out based on the results of detection of wavelength deviation. Because first to Nth calculation circuits $108_1 \sim 108_N$ find the sums of respective current values $I_{PD1}$ and $I_{PD2}$, it is possible to check for variation in the signal level of each of the optical signals and effect control to make the light level constant, or monitor the light level by applying the calculated sum to wavelength control circuit 251.

Figure 12:
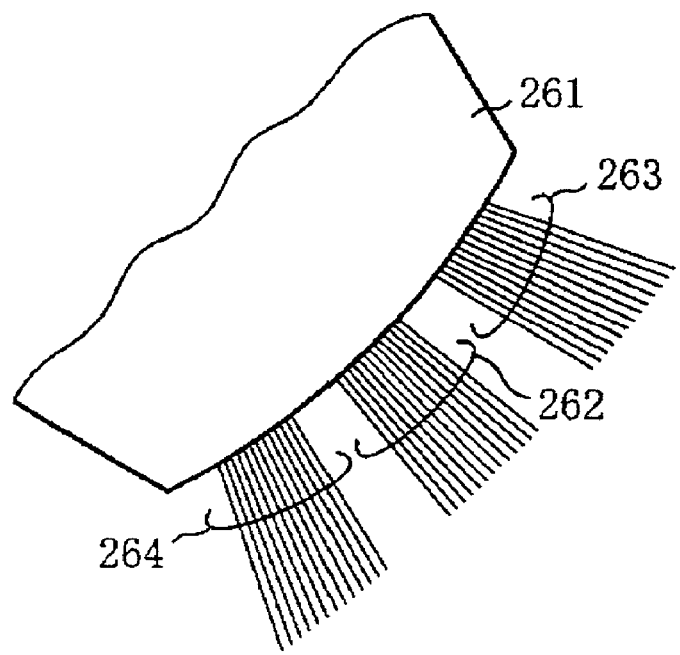
FIG. 12 is a plan view showing the vicinity of the end portions of the output-side slab waveguide in the input-side arrayed waveguide diffraction grating used in the embodiment of FIG. 11.

FIG. 12 shows the vicinity of the end portion of the output-side slab waveguide in the input-side arrayed waveguide diffraction grating that is used in this optical communication system.

Normally, only output waveguide 13 is connected to the output end of an output-side slab waveguide, as with the output-side slab waveguide 16 shown in FIG. 1. In output-side slab waveguide 261 in this embodiment, output signal waveguide 262 is arranged in the central portion of the output-side, and a pair of output monitor waveguides 263 and 264 are also arranged, one on each side of and at a prescribed spacing from output waveguide 262. Of these output monitor waveguides 263 and 264, a nondefective component is selected, and the waveguides are branched and connected to first to Nth Mach-Zehnder circuits $104_1 \sim 104_N$ shown in FIG. 11.

Figure 13:
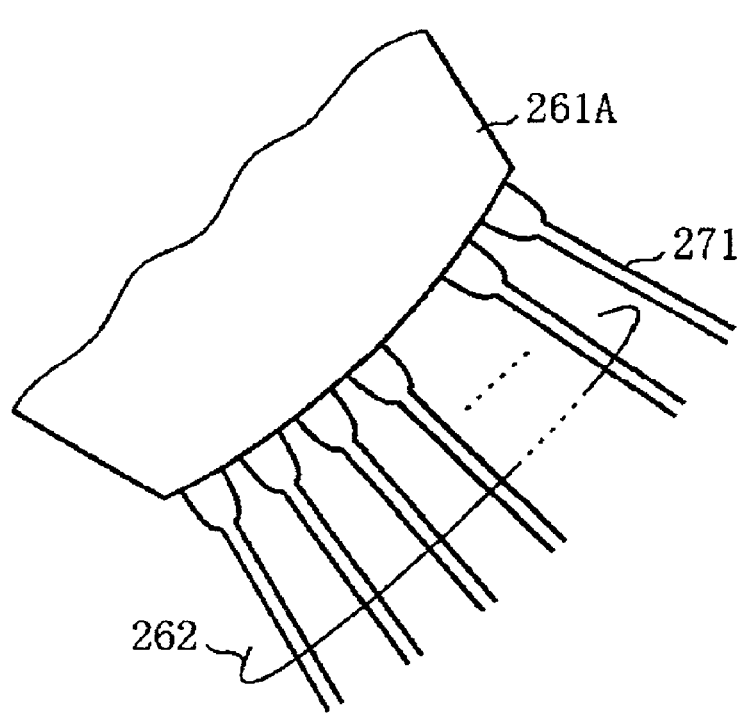
FIG. 13 is a plan view showing a modification of the configuration of the vicinity of the end portion of the output-side slab waveguide.

FIG. 13 shows a modification of the configuration in the vicinity of the end portion of the output-side slab waveguide of FIG. 12. Output-side slab waveguide 261A of this modification is provided with N output waveguides 262 corresponding to wavelengths $\lambda_1 \sim \lambda_N$ and a single output monitor waveguide 271.

By means of this configuration of this modification, one monitor output is generated from one arrayed waveguide diffraction grating of input-side arrayed waveguide diffraction gratings (AWG) 221, and using this monitor output, overall wavelength control is implemented for the optical signals of wavelengths $\lambda_1 \sim \lambda_N$ supplied from the arrayed waveguide diffraction grating.

Figure 14:
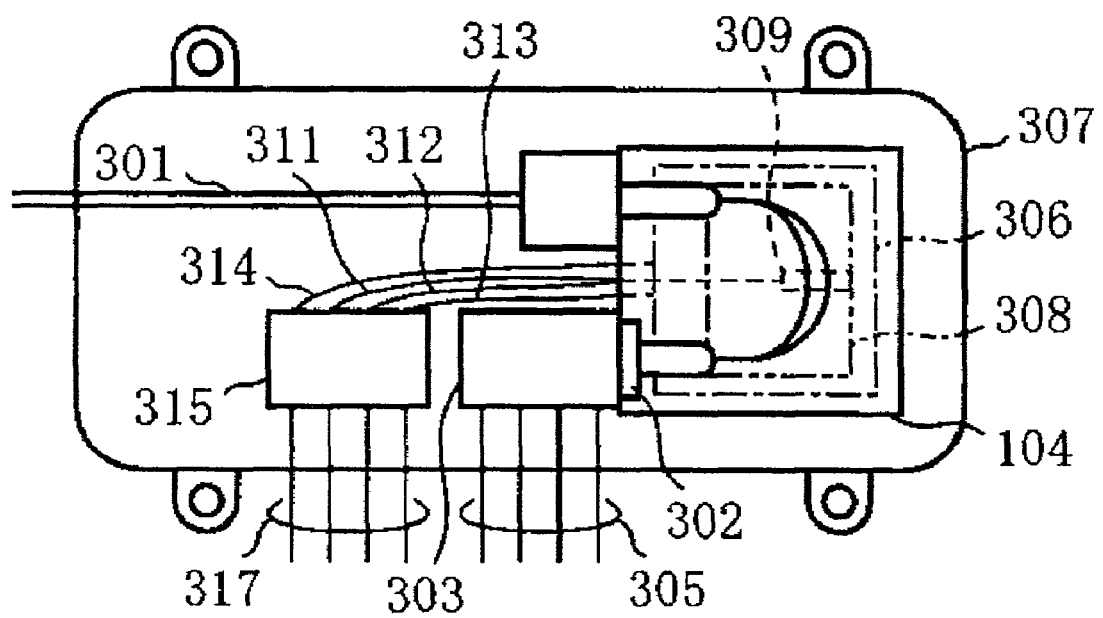
FIG. 14 is a plan view showing the interior of the package that accommodates a Mach-Zehnder circuit and photodiodes.
Figure 15:
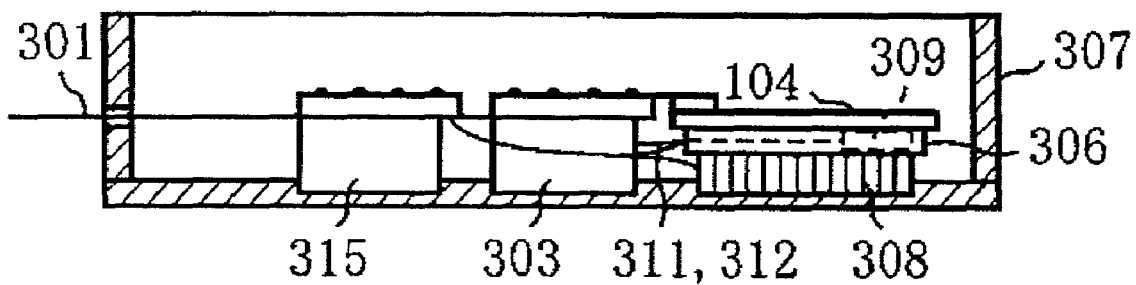
FIG. 15 is a side view of the package of FIG. 14.

FIG. 14 and FIG. 15 show the layout of packages to accommodate a Mach-Zehnder circuit and two photodiodes that make up the output monitor/control device of the present invention. FIG. 14 is a top view of the internal configuration of the package, and FIG. 15 is a side view of the internal configuration. Optical fiber 301 is connected to the input side of Mach-Zehnder circuit 104 to guide laser light. First and second photodiodes $106_1$ and $106_2$ shown in FIG. 6 are mounted on photodiode submount 302, and arranged on the output side of Mach-Zehnder circuit 104. This photodiode submount 302 is attached to photodiode wiring substrate 303, and four signal lines 305 for supplying output current lead out to the outside from this wiring substrate 303.

Copper plate 306 having an area slightly smaller than Mach-Zehnder circuit 104 is arranged below Mach-Zehnder circuit 104, and Peltier element 308 having a lower end portion attached to the base of package body 307 is arranged below this copper plate 306. A trench (not shown in the figure) is cut into the surface of copper plate 306, and a compact thermistor temperature detector 309 is embedded in this trench.

Two lead wires 311 and 312 are led out from thermistor temperature detector 309. The lead wires 311 and 312, and control lines 313 and 314 for controlling drive of Peltier element 308 are connected to drive submount 315, and four control lines 317 are led from drive submount 315 to the outside.

In this layout, copper plate 306 is arranged so as to cover substrate portions for which temperature control of Mach-Zehnder circuit 104 is particularly required and temperature control is implemented by Peltier element 308, whereby this portion can be kept in a uniform temperature distribution. Moreover, the embedding of thermistor temperature detector 309 and a portion of two lead wires 311 and 312 in copper plate 306 effectively suppresses the unwanted transmission of the external temperature from portions of these lead wires 311 and 312 to temperature detector 309.

The four signal lines 305 and four control lines 317 of this layout are connected to circuit components not shown in the figure that are outside the package body 307, and the wavelength of the laser light transmitted over optical fiber 301 is controlled to a prescribed value.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. An output monitor/control device, comprising:
   a Mach-Zehnder circuit that receives a light beam, branches the received light beam into two light beams having a phase difference of 180°, and transmits each of the light beams, exhibiting a periodic optical transmittance-optical frequency characteristic with a period of a frequency interval corresponding to a predetermined free spectral range;
   a first photoelectric conversion means and a second photoelectric conversion means, each for receiving a respective one of two light beams that have emerged from said Mach-Zehnder circuit;
   a calculation means for calculating a predefined discrimination formula to evaluate a wavelength change in each of said light beams based on conversion outputs of said first photoelectric conversion means and said second photoelectric conversion means; and
   a wavelength control means for detecting change in wavelength based on a calculation result obtained by said calculation means and adjusting said wavelength to a preset value,
   wherein said conversion outputs change responsively to a wavelength change in accordance with said optical transmittance-optical frequency characteristic.

2. An output monitor/control device according to claim 1, wherein said Mach-Zehnder circuit is adjusted in advance such that a wavelength to be controlled is included in a wavelength region that corresponds to a frequency region in which an optical transmittance-optical frequency characteristic curve of said Mach-Zehnder circuit changes steeply.

3. An output monitor/control device according to claim 2, wherein a wavelength interval that corresponds to said free spectral range is identical to a wavelength interval of an ITU (International Telecommunications Union) grid.

4. An output monitor/control device according to claim 1, wherein the wavelength of said light beams is controlled by varying at least one of a drive current of a light source of said light beams and an ambient temperature.

5. An output monitor/control device according to claim 1, wherein said Mach-Zehnder circuit comprises a single-side Mach-Zehnder circuit.

6. An output monitor/control device according to claim 1, further including:
   a level calculation means for calculating a sum of the conversion outputs of said first photoelectric conversion means and said second photoelectric conversion means to evaluate an intensity variation in a total amount of light that emerges from said Mach-Zehnder circuit; and
   a level adjusting means for compensating for a variation in a level of light that emerges from said Mach-Zehnder circuit based on said sum of the conversion outputs.

7. An output monitor/control device according to claim 1, wherein a wavelength interval that corresponds to said free spectral range is identical to a wavelength interval of an ITU (International Telecommunications Union) grid.

8. An output monitor/control device according to claim 1, further comprising an arrayed waveguide diffraction grating for receiving a wavelength-division-multiplexed optical signal and demultiplexing the multiplexed optical signal to generate demultiplexed optical signals.

9. An output monitor/control device, comprising:
a Mach-Zehnder circuit that receives a light beam, branches the received light beam into two light beams having a phase difference of 180°, and transmits each of the light beams, exhibiting a periodic optical transmittance-optical frequency characteristic with a period of a frequency interval corresponding to a predetermined free spectral range;
a first photoelectric conversion means and a second photoelectric conversion means, each for receiving a respective one of two light beams that have emerged from said Mach-Zehnder circuit; and
a calculation means for calculating a predefined discrimination formula to evaluate a wavelength change in each of said light beams based on conversion outputs of said first photoelectric conversion means and said second photoelectric conversion means,
wherein said conversion outputs change responsively to a wavelength change in accordance with said optical transmittance-optical frequency characteristic,
wherein said Mach-Zehnder circuit is adjusted in advance such that a wavelength to be controlled is included in a wavelength region that corresponds to a frequency region in which an optical transmittance-optical frequency characteristic curve of said Mach-Zehnder circuit changes steeply, and
wherein said discrimination formula comprises a ratio of the conversion output of either one of said first and second photoelectric conversion means to a sum of conversion outputs of said first photoelectric conversion means and said second photoelectric conversion means.

10. An output monitor/control device according to claim 9, further including:
a level calculation means for calculating a sum of the conversion outputs of said first photoelectric conversion means and said second photoelectric conversion means to evaluate an intensity variation in a total amount of light that emerges from said Mach-Zehnder circuit; and
a level adjusting means for compensating for variation in a level of light that emerges from said Mach-Zehnder circuit based on said sum of the conversion outputs.

11. An output monitor/control device, comprising:
a Mach-Zehnder circuit that receives a light beam, branches the received light beam into two light beams having a phase difference of 180°, and transmits each of the light beams, exhibiting a periodic optical transmittance-optical frequency characteristic with a period of a frequency interval corresponding to a predetermined free spectral range;
a first photoelectric conversion means and a second photoelectric conversion means, each for receiving a respective one of two light beams that have emerged from said Mach-Zehnder circuit; and
a calculation means for calculating a predefined discrimination formula to evaluate a wavelength change in each of said light beams based on conversion outputs of said first photoelectric conversion means and said second photoelectric conversion means,
wherein said conversion outputs change responsively to a wavelength change in accordance with said optical transmittance-optical frequency characteristic,
wherein said Mach-Zehnder circuit is adjusted in advance such that a wavelength to be controlled is included in a wavelength region that corresponds to a frequency region in which an optical transmittance-optical frequency characteristic curve of said Mach-Zehnder circuit changes steeply, and
wherein said discrimination formula comprises a ratio of the difference between the conversion outputs of said first photoelectric conversion means and said second photoelectric conversion means to the sum of the conversion outputs of said first photoelectric conversion means and said second photoelectric conversion means.

12. An optical communication system, comprising:
an optical transmission means for transmitting optical signals of different wavelengths in parallels;
a multiplexer having an arrayed waveguide diffraction grating for performing wavelength division multiplexing of said optical signals transmitted by said optical transmission means;
an optical transmission path for transmitting a wavelength division multiplexed optical signal provided by said multiplexer;
nodes arranged midway on said optical transmission path;
a demultiplexer having an arrayed waveguide diffraction grating for receiving a multiplexed optical signal transmitted by way of said optical transmission path, and demultiplexes said multiplexed optical signal into optical signals of respective wavelengths; and
an optical receiver for receiving optical signals of each wavelength demultplexed by said demultiplexer;
wherein said optical transmission means and said nodes each have an output monitor/control device, said output monitor/control device comprising:
an arrayed waveguide diffraction grating for receiving the wavelength-division-multiplexed optical signal and demultiplexing the multiplexed optical signal to generate demultiplexed optical signals;
Mach-Zehnder circuits each of which receives a demultiplexed optical signal, branches the demultiplexed optical signal into two light beams having a phase difference of 180°, and transmits each of these light beams, exhibiting a periodic optical transmittance-optical frequency characteristic having a period of a frequency interval that corresponds to a predetermined free spectral range;
sets of first photoelectric conversion means and second photoelectric conversion means each for receiving a respective one of said two light beams that have emerged from said Mach-Zehnder circuit;
calculation means each for calculating a predefined discrimination formula for evaluating a wavelength change in said light beams based on conversion outputs of said first photoelectric conversion means and said second photoelectric conversion means, wherein said conversion outputs change responsively to a wavelength change in accordance with said optical transmittance-optical frequency characteristic; and
a wavelength control means for detecting changes in wavelengths based on calculation results obtained by said calculation means and adjusting the wavelengths to preset values.

13. An optical communication system according to claim 12, further comprising:
a level control means for compensating for variation in the level of optical signals supplied from said Mach-Zehnder circuit based on a calculation result of a sum of conversion outputs from said first photoelectric conversion means and said second photoelectric conversion means calculated by said calculation means.

14. An output monitor/control device according to claim 1, further comprising a plurality of Mach-Zehnder circuits each of which receives a demultiplexed optical signal, branches the demultiplexed optical signal into two light beams having a phase difference of 180°, and transmits each of these light beams, exhibiting a periodic optical transmittance-optical frequency characteristic having a period of a frequency interval that corresponds to a predetermined free spectral range.

15. An output monitor/control device, comprising:
a Mach-Zehnder circuit that receives a light beam, branches the received light beam into two light beams having a phase difference of 180°, and transmits each of the light beams, exhibiting a periodic optical transmittance-optical frequency characteristic with a period of a frequency interval corresponding to a predetermined free spectral range;
a first photoelectric conversion means and a second photoelectric conversion means, each for receiving a respective one of two light beams that have emerged from said Mach-Zehnder circuit; and
a calculation means for calculating a predefined discrimination formula to evaluate a wavelength channel in each of said light beams based on conversion outputs of said first photoelectric conversion means and said second photoelectric conversion means, wherein said conversion outputs change responsively to a wavelength change in accordance with said optical transmittance-optical frequency characteristic, and
wherein said discrimination formula is a ratio of a conversion output of either one of said first and second photoelectric conversion means to a sum of conversion outputs of said first photoelectric conversion means and said second photoelectric conversion means.

16. An output monitor/control device, comprising:
a Mach-Zehnder circuit that receives a light beam, branches the received light beam into two light beams having a phase difference of 180°, and transmits each of the light beams, exhibiting a periodic optical transmittance-optical frequency characteristic with a period of a frequency interval corresponding to a predetermined free spectral range;
a first photoelectric conversion means and a second photoelectric conversion means, each for receiving a respective one of two light beams that have emerged from said Mach-Zehnder circuit; and
a calculation means for calculating a predefined discrimination formula to evaluate a wavelength change in each of said light beams based on conversion outputs of said first photoelectric conversion means and said second photoelectric conversion means, wherein said conversion outputs change responsively to a wavelength change in accordance with said optical transmittance-optical frequency characteristic, and
wherein said discrimination formula comprises a ratio of a difference between the conversion outputs of said first photoelectric conversion means and said second photoelectric conversion means to a sum of the conversion outputs of said first photoelectric conversion means and said second photoelectric conversion means.

17. An optical communication system, comprising:
an optical transmission means for transmitting optical signals of different wavelengths in parallel; and
nodes arranged midway on an optical transmission path,
wherein said optical transmission means and said nodes each have an output monitor/control device, said output monitor/control device comprising:
an arrayed waveguide diffraction grating for receiving a wavelength-division-multiplexed optical signal and demultiplexing the multiplexed optical signal to generate demultiplexed optical signals;
a plurality of Mach-Zehnder circuits, which receives a demultiplexed optical signal, branches the demultiplexed optical signal into two light beams having a phase difference of 180°, and transmits each of these light beams, exhibiting a periodic optical transmittance-optical frequency characteristic having a period of a frequency interval that corresponds to a predetermined free spectral range; and
calculation means for calculating a predefined discrimination formula for evaluating a wavelength change in said light beams.

* * * * *